March 19, 1935.   E. WEHRHAN   1,994,552
COMBINED SEED PLANTER
Filed April 20, 1934   2 Sheets-Sheet 1
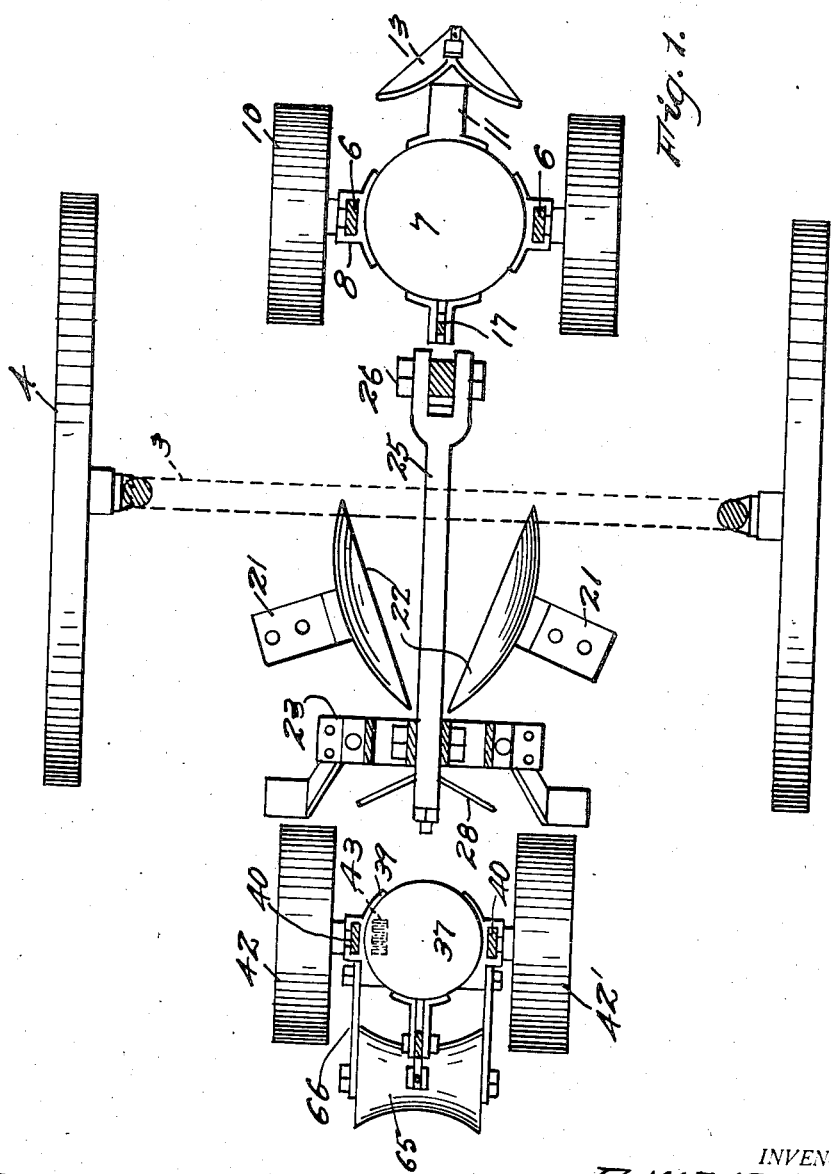

March 19, 1935.  E. WEHRHAN  1,994,552
COMBINED SEED PLANTER
Filed April 20, 1934    2 Sheets-Sheet 2
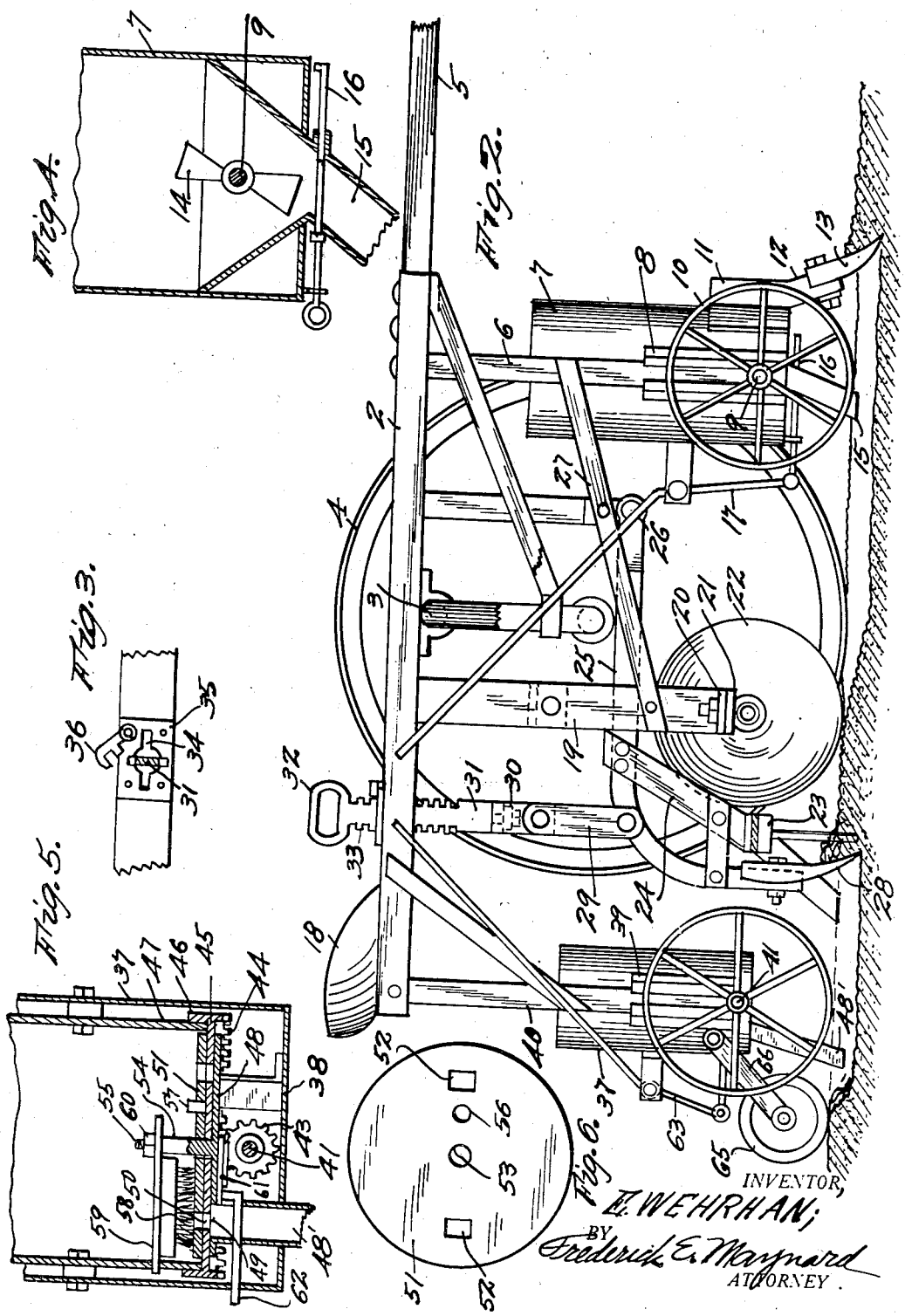

Patented Mar. 19, 1935

1,994,552

UNITED STATES PATENT OFFICE 1,994,552

COMBINED SEED PLANTER

Edward Wehrhan, Earp, Calif.

Application April 20, 1934, Serial No. 721,500

6 Claims. (Cl. 111—73)

This invention is an agricultural apparatus of the class of seed planters.

It is an object to provide a machine which will serve in one operation to open a ground furrow, to place fertilizer in the furrow, to throw a bed of soil over the fertilized furrow, to rake the bed smooth and mix the soil and the fertilizer, to open a trench in the prepared soil, to drop in seed at desired intervals along the trench, and to lay soil over the seed.

It is also an object to provide for change of width of the prepared soil bed and change of furrow depth.

Another object is to provide for the rise and fall of the seed hopper and the fertilizer.

An additional object is to provide a one-man operated machine for the elimination of several separate machine operations, and operators, and save in time consumed thereby in planting seed.

A further purpose is to provide means to maintain a uniform depth of fertilizer furrow and of seed trench regardless of grade undulations, and to provide for elevation of the trencher and rake device while turning at row ends.

The invention consists in certain advancements in this art as set forth in the ensuing disclosure and having, with the above, additional objects and advantages as hereinafter developed, and whose construction, combination and details of means, and the manner of operation will be made manifest in the description of the herewith illustrative embodiment; it being understood that modifications, variations and adaptations may be resorted to within the scope, principle and spirit of the invention as it is more directly claimed hereinafter.

Figure 1 is a horizontal sectional view of the apparatus with parts in plan, and omitting the upper frame work.

Figure 2 is a diagrammatic, side elevation and partial section of the apparatus; the draft tongue being broken away.

Figure 3 is a detail plan and section of the rake elevator.

Figure 4 is a sectional view of the lower portion of the fertilizer bin.

Figure 5 is an axial sectional view of the lower portion of the seed dispensing device.

Figure 6 is a plan of the interchangeable seed spacer and gauge plate.

In its illustrated embodiment the apparatus includes a substantial, appropriately built-up frame structure 2 supported on an arched axle 3 having end journals for side wheels 4 of any desired type. Extending forwardly from the frame is a draft tongue 5.

At the forward end of the frame there is a downwardly extending set of vertical guide bars 6 between the lower portions of which there is disposed a fertilizer bin 7 having side boxes 8 slidably receiving the legs 6 so that the bin may have free relative up and down movement as to the guide legs 6.

Extending through the bottom of the bin 7 is a shaft 9 having fixed on its ends a pair of wheels 10 which support the bin and cause it to remain at a uniform distance as to the grade of the soil.

Fixed to the front of the bin 7 is a bracket 11 having a downwardly extending horn 12 to which is secured at any desired elevation a furrow making plow 13 which acts to cut the furrow as the vehicle is drawn forward. It will be seen that the furrow plow 13 cuts a uniform depth of furrow as determined by the grade wheels 10.

Fixed on the shaft 9, Fig. 4, is an agitating device 14 to break up fertilizer in the bin to facilitate its discharge through a bottom shoot 15 of the bin. When turning corners or for other reasons the fertilizer discharge may be stopped by a slidable gate 16 mounted below the agitator 14 and operative by a simple wire rod lever 17, Fig. 2, the handle of which is extended to a position contiguous to the vehicle seat 18 on the frame 2.

Spaced as desirable in rear of the bin 7 is a suitable pendant bracket 19 having spaced side legs with foot portions 20 to which may be adjustably secured journal arms 21 of respective discs 22 which are shown in Fig. 1 as disposed at rearwardly converging angles; one disc on each side of the longitudinal center of the machine. The purpose of these discs is to throw soil inwardly and make a bed over the fertilizer which has been placed in the furrow prepared by the forward plow 13. By adjusting the discs 22 angularly or laterally the width of the bed can be easily determined.

Just in the rear of the discs 22 there is disposed a transverse rake 23 fixed to the lower end of a bracket 24 which is secured to a rake beam 25 which extends forwardly and is pivoted at 26 on a suitable hanger which may consist of a brace device 27 connecting the hanger or guide 6 and the bracket 19.

The rear end of the rake beam is turned downwardly and there is secured thereon a vertically adjustable trench plow 28 the purpose of which is to dig a trench in the fertilized bed after this has been raked over by the rake 23 which has the function of mixing the soil and the fertilizer in readiness for seed planting.

In order to provide for elevation of the rake and trench plow, as when it is desired to turn at the end of a row or for other purpose, a suitable means is provided. As shown the elevator includes a link 29 to the upper end of which there is connected by a swivel 30 an elevating shank 31 passing through the center beam of the frame, and having a handle 32 at its upper end by which the operator may manually lift the rake device. The shank is provided with side notches 33 and is adapted to work vertically in a keyhole 34 provided in a plate 35 and permitting the shank to be rotated a quarter turn so as to bring it astride the keyhole plate 35 and thus sustain the rake device at the desired elevation above the ground. This device also determines the depth at which it may be desired to cut the trench by the plow 28.

A seed dispenser is arranged just rear of the trench plow 28 and consists of an outer shell 37 having a closed bottom 38 and provided with side, guide boxes 39 slidably and freely receiving vertical guide legs 40 fixed to the frame 2. Extending into the shell 37 and above its bottom is a shaft 41 having a fixed end wheel 42 and a loose end wheel 42' running on the grade at the sides of the trench made by the plow 28 and which wheels thus maintain the seed planter at a uniform distance above grade. Fixed on the shaft 41 is a pinion 43 which engages an inverted crown gear 44 provided on a disc valve 45 which has a flange 46 receiving and turnably fitting the lower end of a seed hopper 47 which is fixed in the shell 37.

The disc valve 45 is turnably supported on an elevated table 48 fixed in the shell 37 and having a seed discharge spout 48' extending through the shell bottom 38 to a suitable degree for dropping the seed directly into the trench as shown in Fig. 2. The table 48 has a large seed aperture 49 and the gear valve 45 has one or more seed apertures 50 to register with the table aperture for the discharge of seed at regular intervals and at suitable distances along the trench as determined by the rate of rotation of the gear valve 45 and the number of its seed apertures 50.

For the convenient regulation of the seed dispenser as to the size of seed being planted and the number at each dropping and the spacings of the droppings along the trench there is provided a plurality of selective gauge and spacer plates of which one is indicated in plan at 51. This plate has two seed apertures 52 registering with apertures 50 in the gear valve 45. The spacer plate 51 is also provided with an aperture 53 to pass over a stud 54 fixed on the center of the table 48 and having an upper threaded end 55. The plate 51 also has an aperture 56 to receive a positioning lug 57 fixed on the valve gear 45 so as to determine the relative position of the apertures of these parts.

A brush 58 sweeps on the bottom valve plate 51 and is secured on a bridge 59 one end of which engages in the wall of the hopper 47 and the other end fits down over the screw part 55 of the stud 54 and is fastened by a nut 60. This provides for ready removal of the brush and change of the valve plates 51 as may be desired.

At such times as may be desired seed discharge is stopped by a slide gate 61 mounted on the bottom of the table 48 and having a stem 62 to which is connected any suitable operating lever or device 63, Fig. 2, the handle of which is extended within reach of the operator of the apparatus.

For safety the rake elevator shank 31 may be engaged in its adjusted position by a suitable latch 36.

After the seeds have been dropped in the trench a covering roller 65, which is connected by links 66 to the rear of the seed dispenser, drags earth over the seed in completion of the process. It will be seen that the containers 7—37 have a free, vertical sliding movement on the guides 6—40 according to the lay of the soil over which the wheels of the containers run and that they are independent of like movement of the main frame wheels 4.

What is claimed is:

1. An implement of the class described including a wheeled frame, a rake beam pivoted on the frame, a trench plow attached to the beam, and means to regulate the depth of plow cut and to elevate the plow from cutting level, means to make a furrow in advance of the rake, means to deposit fertilizer in the furrow, means to bed soil over the fertilizer in advance of the rake and plow, and a seed planter to place seed in the trench made by the trench plow.

2. An implement of the class described having, in combination; a wheeled, main frame having guide devices fixed thereto, a planter having free, vertical, guided movement on the said devices and including a shell, a shaft mounted on the shell, ground grade wheels on the shaft for supporting the shell at a given distance above grade, and seed dispensing means, in the shell, actuated by the said shaft; said planter rising and falling freely as to the said guide devices according to grade effect on the planter wheels.

3. A machine for distributing fertilizer and depositing seed, having, in combination, a main, wheeled frame, a means for distributing fertilizer, a means for placing seed in the fertilized soil, and guide means attached to the frame providing for the free vertical movement of the fertilizing means and the seed means according to soil grade along the line of planting to accomplish uniform depth of planting.

4. A machine as set forth in claim 3 and provided with means between the fertilizing means and the seed planter for bedding and mixing the fertilized soil.

5. A machine as set forth in claim 3 and in which the fertilizing means is provided with a leading, furrow plow, and the seed planter has a seed covering device.

6. A machine as set forth in claim 3, provided with means for making a seed trench in advance of the seed planter, and having a device for controlling depth of trench.

EDWARD WEHRHAN.